United States Patent
Zhang et al.

(10) Patent No.: US 9,445,303 B2
(45) Date of Patent: *Sep. 13, 2016

(54) CAPACITY STATION ACTIVATION METHOD, WIRELESS COMMUNICATION APPARATUS AND SYSTEM

(71) Applicant: HUAWEI TECHNOLOGIES CO., LTD., Shenzhen, Guangdong (CN)

(72) Inventors: Shunqing Zhang, Shanghai (CN); Xiuqiang Xu, Shanghai (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

This patent is subject to a terminal disclaimer.

(21) Appl. No.: 14/064,452

(22) Filed: Oct. 28, 2013

(65) Prior Publication Data

US 2014/0050097 A1 Feb. 20, 2014

Related U.S. Application Data

(63) Continuation of application No. PCT/CN2012/074647, filed on Apr. 25, 2012.

(30) Foreign Application Priority Data

Apr. 29, 2011 (CN) .......................... 2011 1 0111348
Apr. 21, 2012 (CN) .......................... 2012 1 0118970

(51) Int. Cl.
*H04M 3/00* (2006.01)
*H04W 40/00* (2009.01)
(Continued)

(52) U.S. Cl.
CPC ......... *H04W 28/0284* (2013.01); *H04W 24/02* (2013.01); *H04W 28/08* (2013.01);
(Continued)

(58) Field of Classification Search
CPC combination set(s) only.
See application file for complete search history.

(56) References Cited

U.S. PATENT DOCUMENTS 9,042,879 B2 * 5/2015 Zhang ............... H04W 52/0219
455/419
2002/0012385 A1 1/2002 Yun et al.
(Continued)

FOREIGN PATENT DOCUMENTS

CN 1383634 12/2002
CN 101388693 A 3/2009
(Continued)

OTHER PUBLICATIONS

Chinese Search Report dated Jul. 16, 2014 in corresponding Chinese Patent Application No. 2012101189702.
(Continued)

*Primary Examiner* — Yemane Mesfin
*Assistant Examiner* — Mon Cheri Davenport
(74) *Attorney, Agent, or Firm* — Staas & Halsey LLP

(57) ABSTRACT

Embodiments of the present invention provide a capacity station activation method and system. A coverage station sends activation control information to a capacity station, where the activation control information enables the capacity station to send a pilot signal to a user in a power decreasing manner; receives a pilot signal measurement result from the user; determines, according to the measurement result, a capacity station that needs to be activated to meet a system requirement; and sends activation information to the determined capacity station that needs to be activated. According to the capacity station activation method and system provided by the embodiments of the present invention, the capacity station that needs to be activated can be more accurately determined, transmit power of an activated capacity station can be controlled, and power consumption of an entire system can be reduced.

23 Claims, 2 Drawing Sheets

(51) Int. Cl.
*H04W 28/02* (2009.01)
*H04W 24/02* (2009.01)
*H04W 52/16* (2009.01)
*H04W 52/34* (2009.01)
*H04W 52/02* (2009.01)
*H04W 28/08* (2009.01)
*H04W 16/04* (2009.01)
*H04W 52/04* (2009.01)

(52) U.S. Cl.
CPC ......... *H04W52/0206* (2013.01); *H04W 52/16* (2013.01); *H04W 52/343* (2013.01); *H04W 16/04* (2013.01); *H04W 52/04* (2013.01); *Y02B 60/50* (2013.01)

(56) References Cited

U.S. PATENT DOCUMENTS

| | | | |
|---|---|---|---|
| 2005/0107106 A1 | 5/2005 | Valkealahti et al. | |
| 2005/0143113 A1* | 6/2005 | Lee | H04W 52/60 455/522 |
| 2009/0253461 A1* | 10/2009 | Kuwahara | H04W 52/0206 455/561 |
| 2009/0280819 A1* | 11/2009 | Brisebois | H04W 52/244 455/446 |
| 2009/0295546 A1 | 12/2009 | Ha et al. | |
| 2012/0028674 A1 | 2/2012 | Zhao | |

FOREIGN PATENT DOCUMENTS

| | | |
|---|---|---|
| CN | 101873677 A | 10/2010 |
| CN | 101951664 A | 1/2011 |

OTHER PUBLICATIONS

Extended European Search Report dated Aug. 1, 2014 in corresponding European Patent Application No. 12776488.4.
"3$^{rd}$ Generation Partnership Project; Technical Specification Group Radio Access Networks; Evolved Universal Terrestrial Radio Access (E-UTRA); Potential solutions for energy saving for E-UTRAN (Release 10)", 3GPP TR 36.927 1.1.1, Feb. 2011, pp. 1-21.
"Energy Saving solution enhancement", Huawei, 3GPP TSG RAN WG3 Meeting #72, Barcelona, Spain, May 2011, 8 pp.
"BS probing solution for hotspot cell switch-on—Feasibility and benefits", KPN B.V., TNO, 3GPP TSG RAN WG3 Meeting #70bis, Dublin, Ireland, Jan. 2011, 5 pp.
"BS probing approach for energy saving wake up in hotspot deployments", TNO, KPN B.V., Samsung, 3GPP TSG RAN WG3 Meeting #70, Florida, USA, Nov. 2010, 4 pp.
"Power control for cell activation in BS probing scheme", Fujitsu, 3GPP TSG-RAN WG3 #73bis, Zhuhai, China, Oct. 2011, 3 pp.
PCT International Search Report and Written Opinion of the International Searching Authority mailed Jul. 26, 2012 in corresponding International Application No. PCT/CN2012/074647 (11 pp.)
International Search Report, dated Jul. 26, 2012, in corresponding International Application No. PCT/CN2012/074647 (4 pp.).

* cited by examiner

CAPACITY STATION ACTIVATION METHOD, WIRELESS COMMUNICATION APPARATUS AND SYSTEM

CROSS-REFERENCE TO RELATED APPLICATION

This application is a continuation of International Application No. PCT/CN2012/074647, filed on Apr. 25, 2012, which claims priority to Chinese Patent Application No. 201110111348.4, filed on Apr. 29, 2011 and Chinese Patent Application No. 201210118970.2, filed on Apr. 21, 2012, all of which are hereby incorporated by reference in their entireties.

FIELD OF THE INVENTION

Embodiments of the present invention relate to communication technologies, and in particular, to a base station device activation and power control method, an apparatus, and a wireless communication system.

BACKGROUND OF THE INVENTION

With the rapid increase of capacity and a data rate, wireless communication plays a more and more significant role in energy consumption. To solve a problem of a high capacity and high data volume requirement, an operator deploys wireless networks of multiple access technologies (GERAN/UTRAN/EUTRAN) and deploys base stations of multiple transmit power levels (Macro/Micro/LPN) in a same area, which makes an actual network structure become extremely complicated. A high capacity and a high data rate require a base station to have relatively high transmit power, and numerous low power nodes, such as hot spot cells, exacerbate an energy consumption problem undoubtedly.

When the operator deploys a wireless network in a certain area, on the basis of providing basic network coverage, the operator generally deploys a network of a different standard or an inter-frequency network of a same standard, or deploys a capacity station in a hot spot to perform a service upgrade or capacity enhancement. For ease of description, a base station that provides basic network coverage is called a coverage station, and a base station or a hot spot cell that performs a service upgrade or capacity enhancement and overlaps the coverage station in coverage is called a capacity station. When a capacity station is light-loaded, the capacity station gets into a dormant state to save power; when a coverage station is heavy-loaded, part or all of capacity stations in a dormant state are activated to share loads. In fact, the when the coverage station is heavy-loaded, loads are generally not evenly distributed in a coverage range, but are centralized in some certain areas; in this case, it is only required to activate a capacity station in a corresponding area and make the capacity station work at a proper transmit power level, enough loads may be transferred out and the loads may be reduced to a proper level. In applications, an existing capacity station activation solution may have the following problems: After multiple capacity stations are activated simultaneously and work at a maximum transmit power level, a load of a coverage station may decrease to an extremely low level or even zero, which is actually not good for enhancing overall energy efficiency of a network.

SUMMARY OF THE INVENTION

Embodiments of the present invention provide a capacity station activation method and system, which can more accurately determine a capacity station that needs to be activated, control transmit power of the activated capacity station, and reduce energy consumption of an entire system.

A capacity station activation method includes: sending first activation control information to a capacity station in a first capacity station group $S_0$, where the activation control information is used to enable the capacity station to send a first pilot signal to a user at first transmit power and enable the user to measure the pilot signal;

receiving a pilot signal measurement result sent by the user, and selecting a second capacity station group $S_1$ from the capacity station according to the first pilot signal measurement result;

sending second activation control information to the second capacity station group $S_1$, where the second activation control information is used to enable a capacity station in the second capacity station group $S_1$ to send a second pilot signal to the user at second transmit power and enable the user to measure the pilot signal, and the second transmit power is less than the first transmit power;

receiving a second pilot signal measurement result sent by the user, calculating a load of each capacity station in the second capacity station group $S_1$ according to the second pilot signal measurement result; and determining, according to the load of each capacity station in the second capacity station group $S_1$, a capacity station that needs to be activated to meet a system requirement; and sending activation information to the capacity station that needs to be activated, activating the capacity station that needs to be activated and enabling it to work at the second transmit power after it is activated.

Further, a wireless communication system is provided and includes a capacity station and a coverage station, where the capacity station belongs to the coverage station, the coverage station includes at least two transmit power levels, and the coverage station is configured to: send multiple pieces of activation control information to the capacity station, where the multiple pieces of activation control information enable the capacity station to send a pilot signal to a user in a power decreasing manner; receive a pilot signal measurement result from the user; determine, according to the measurement result, a capacity station that needs to be activated to meet a system requirement; and send activation information to the determined capacity station that needs to be activated; and the capacity station is configured to: receive the activation control information from the coverage station; and send the pilot signal to the user in a transmit power decreasing manner until the coverage station determines the capacity station that needs to be activated to meet the system requirement; and is further configured to: receive, in a dormant state, the activation information sent by the coverage station, change to a working state, and work at the power at which the capacity station sends the pilot signal when the coverage station sends the activation information to the determined capacity station that needs to be activated.

Further, an embodiment of the present invention provides a communication base station, including:

a sending unit, configured to send multiple pieces of activation control information to a capacity station that belongs to the base station, where the multiple pieces of activation control information are used to enable the capacity station to send a pilot signal to a user in a power decreasing manner;

a receiving unit, configured to receive a pilot signal measurement result sent by the user; and a calculating unit, configured to determine, according to the pilot signal measurement result sent by the user, a capacity station that needs to be activated to meet a system requirement, where the sending unit sends activation information to the capacity station that needs to be activated, so that the capacity station that needs to be activated and is in a dormant state changes to a working state and works at the power at which the capacity station sends the pilot signal when the coverage station sends the activation information to the determined capacity station that needs to be activated.

In the embodiments of the present invention, the capacity station sends the pilot signal in a power decreasing manner to activate the capacity station, and proper transmit power is determined according to measurement of the pilot signal by the user, so that, after being activated, the capacity station may work at a certain proper transmit power level lower than a maximum power level, and it is ensured that a load of the coverage station decreases to a proper level. Meanwhile, for the capacity station that is activated but does not work at full transmit power, the transmit power of such capacity station may be increased to the maximum level preferentially to further absorb the load when the load of the coverage station further rises.

DETAILED DESCRIPTION OF THE EMBODIMENTS

Figure 1:
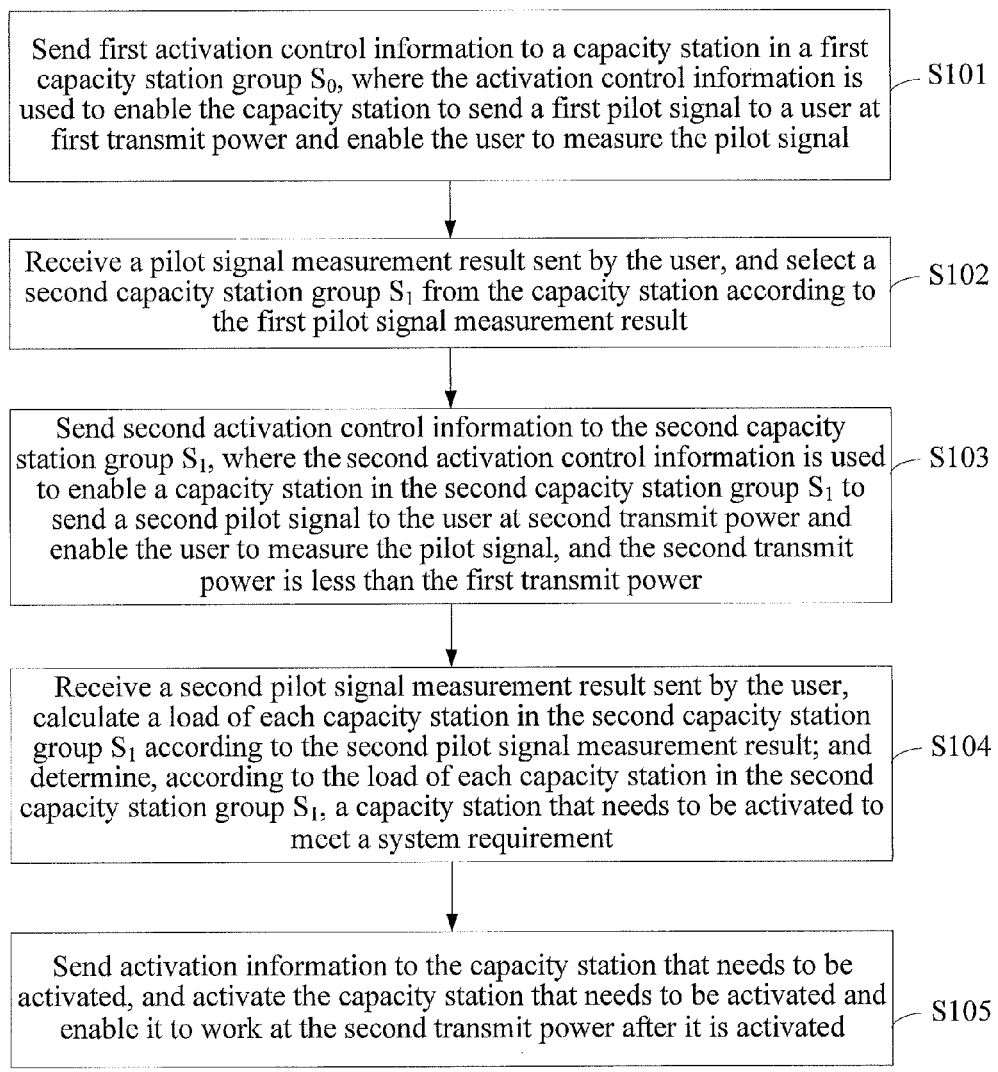
FIG. 1 is a flowchart of a capacity station activation method according to an embodiment of the present invention.

To make the objectives, technical solutions, and advantages of the present invention more comprehensible, the following further describes the embodiments of the present invention in detail with reference to the accompanying drawings.

In an embodiment, a capacity station uses at least two levels of pilot transmit power in an activation decision process, which are low transmit power $P_{low}$, and high transmit power $P_{max}$, where the $P_{max}$, may be maximum pilot transmit power of a hot spot cell, and the $P_{low}$, is a certain preset power level lower than the $P_{max}$. It should be noted that, in an actual application of this solution, the hot spot cell may use more levels of pilot transmit power, where a highest level of transmit power is preferentially the maximum pilot transmit power of the hot spot cell; in implementation, the capacity station sequentially adjusts pilot transmit power in a decreasing manner until a coverage station determines a proper capacity station that needs to be activated.

In the following specific implementations, a hot spot cell is a capacity station, and a macro base station is a coverage station.

In an embodiment, a load is represented by a typical factor, the number of users in a connected state, that is, the number of users in the connected state is used to represent changes of a load of a macro base station and a load that a hot spot cell after being activated may bear. It should be noted that the technical solutions of the present invention are also applicable to another situation in which another factor, such as air interface resource occupancy rate, is used to represent a load of a base station, or a combination of any several factors, such as the number of users in the connected state and the air interface resource occupancy rate, is used to represent a load.

When a load of a coverage station (for example, the macro base station) is greater than a first threshold, for example, when the number of users in the connected state exceeds a preset first threshold $C_{threshold}$, a capacity station group including all capacity stations in a dormant state within a coverage range of the coverage station is $S_{total}$, where there are N (N≥1) capacity stations in the dormant state participating in activation decision, which are $H_1, H_2, \ldots, H_N$, and a first capacity station group $S_0$ is used to represent these capacity stations that are about to participate in the activation decision. It should be noted that, $S_0$ may be equal to $S_{total}$, and may also be a subset of $S_{total}$, that is, the coverage station may enable all the capacity stations in the dormant state within the coverage range of the coverage station to participate in the activation decision, and may also preselect, according to some algorithms, merely part of the capacity stations in the dormant state within the coverage range of the coverage station to participate in the activation decision. For example, before executing a capacity station activation decision process, the coverage station consults long-term load statistics information of each capacity station in the dormant state, and if the long-term load statistics information shows that in subsequent time, a certain capacity station maintains a quite low load level for a long time after being activated or can merely maintain a medium-high load for a very short time, the coverage station excludes this capacity station from the first capacity station group $S_0$. A capacity station which is within the coverage range of the coverage station, and is in the dormant state, but does not belong to the first capacity station group $S_0$ maintains the dormant state and does not participate in the activation decision. The load herein includes at least the following factor: the number of users in the connected state.

Referring to FIG. 1, FIG. 1 is a flowchart of a capacity station activation method according to an embodiment of the present invention. A coverage station or an OAM (operation administration and maintenance module) executes this method. In the following, coverage station or OAM processing is taken as an example for description.

S101: Send first activation control information to a capacity station in a first capacity station group $S_0$, where the activation control information is used to enable the capacity station to send a first pilot signal to a user at first transmit power and enable the user to measure the pilot signal, to obtain a first pilot signal measurement result.

S102: Receive the first pilot signal measurement result sent by the user, and select a second capacity station group $S_1$ from the capacity station according to the first pilot signal measurement result.

S103: Send second activation control information to the second capacity station group $S_1$, where the second activation control information is used to enable a capacity station in the second capacity station group $S_1$ to send a second pilot signal to the user at second transmit power and enable the user to measure the pilot signal, and the second transmit power is less than the first transmit power.

S104: Receive a second pilot signal measurement result sent by the user, calculate a load of each capacity station in the second capacity station group $S_1$ according to the second pilot signal measurement result; and determine, according to the load of each capacity station in the second capacity station group $S_1$, a capacity station that needs to be activated to meet a system requirement.

S105: Send activation information to the capacity station that needs to be activated, and activate the capacity station that needs to be activated and enable it to work at the second transmit power after it is activated.

Further, if the capacity station that needs to be activated to meet the system requirement cannot be selected according to the second pilot signal measurement result, send activation information to all capacity stations that participate in activation decision and belong to the coverage station, and enable an activated capacity station to work at maximum transmit power.

Further, if the capacity station has more transmit power levels, sequentially adjust transmit power of a pilot signal in a case that the coverage station does not select a proper capacity station that needs to be activated, and select a capacity station that needs to be activated sequentially according to a pilot signal measurement result from the user until a proper capacity station that needs to be activated is determined. It may be deemed that the foregoing step is repeated with different transmit power. If the capacity station that needs to be activated to meet the system requirement cannot be selected after transmit power of each level is tried, send activation information to all capacity stations that participate in activation decision and belong to the coverage station, and enable an activated capacity station to work at maximum transmit power.

In the embodiment of the present invention, the capacity station sends the pilot signal in a power decreasing manner to activate the capacity station, and proper transmit power is determined according to measurement of the pilot signal by the user, so that, after being activated, the capacity station may work at a certain proper transmit power level lower than a maximum power level, and it is ensured that a load of the coverage station decreases to a proper level. Meanwhile, for the capacity station that is activated but does not work at full transmit power, the transmit power of such capacity station may be increased to the maximum level preferentially to further absorb the load when the load of the coverage station further rises.

In a first embodiment of the present invention, a coverage station provides basic network coverage; a capacity station is deployed in a capacity station area within a coverage range of the coverage station to perform capacity enhancement, and is totally covered by the coverage station. When part or all of capacity stations are in a dormant state and a load of the coverage station is relatively high, capacity station activation may be performed by using the technical solution of the present invention.

In the first embodiment, the capacity station uses N-level (N>1) pilot transmit power in an activation decision process: $P_{max}=P_1>P_2> \ldots >P_N>P_0$, where $P_{max}$ is maximum pilot transmit power of the capacity station, or that is to say, the capacity station is deemed to have N levels of transmit power.

The first embodiment includes the following main steps:

Step 1: A coverage station or an OAM (Operation Administration and Maintenance, operation administration and maintenance module) selects a capacity station participating in activation decision, which is represented by a first capacity station group $S_0$ ($S_0$ may be a capacity station group including all capacity stations in a dormant state within a coverage range of the coverage station, and may also be a subset of the foregoing capacity station group selected according to historical load information), and initializes n to 1; then, proceed to step 2. In specific implementation, step 1 is optional, for example, all the capacity stations are capacity stations that need to participate in the decision by default, that is to say, all the capacity stations form the first capacity station group $S_0$ by default.

Step 2: The coverage station or the OAM notifies a capacity station in a capacity station group $S_{n-1}$ to send a pilot signal at a $P_n$ pilot power level and further send a synchronization signal, and configures that a user in a connected state in the coverage station measures the pilot signal sent by the capacity station in $S_{n-1}$ for reporting; then, proceed to step 3.

Step 3: The coverage station or the OAM collects, according to a measurement result sent by the user in the coverage station, statistics about a load which is of the coverage station and may be absorbed by each capacity station in $S_{n-1}$ when the capacity station works at the $P_n$ pilot transmit power level; if n<N, selects a capacity station group $S_n$ from the capacity station group $S_{n-1}$ according to a first preset algorithm, and lets n=n+1; then, return to step 2; where if the capacity station group $S_n$ cannot be selected from the capacity station group $S_{n-1}$ according to the first preset algorithm, proceed to step 4.

Step 4: When n=1, proceed to step 5; when n>1, if an alternative activation capacity station group $S_{wake\_up}$ that meets a system requirement can be selected, according to a second preset algorithm, from the capacity station group $S_{n-1}$, proceed to step 6; if the alternative activation capacity station group $S_{wake\_up}$ that meets the system requirement cannot be selected, let n=n−1 and repeat this step.

Step 5: According to the second preset algorithm, if the alternative activation capacity station group $S_{wake\_up}$ can be selected from the capacity station group $S_0$, the coverage station or the OAM activates a capacity station in the capacity station group $S_{wake\_up}$ and lets it work at a $P_{max}$ pilot transmit power level; then, proceed to step 7; if the alternative activation capacity station group $S_{wake\_up}$ that meets the system requirement cannot be selected from the capacity station group $S_0$, the coverage station or the OAM activates all the capacity stations in the capacity station group $S_0$ and lets them work at the $P_{max}$ pilot transmit power level; then, proceed to step 7.

Step 6: The coverage station or the OAM activates the capacity station in the capacity station group $S_{wake\_up}$ and lets it work at the $P_n$ pilot transmit power level; then, proceed to step 7.

Step 7: When a load of the coverage station further rises and exceeds a preset threshold, if a capacity station that is activated but does not work at full transmit power exists within the coverage range of the coverage station, the coverage station or the OAM notifies the capacity station that is activated but does not work at the full transmit power to increase the pilot power to a maximum transmit level; after all activated capacity stations within the coverage range of the coverage station work at the maximum pilot transmit power level, if the load of the coverage station is still higher than the preset threshold, the coverage station or the OAM repeats step 1 to step 6, and executes the capacity station activation process until all the capacity stations within the coverage range of the coverage station are in an activated state and work at the maximum pilot transmit power level.

The first preset algorithm in the embodiment may be the following method:

after the coverage station or the OAM collects, according to the measurement result reported by the user in the connected state in the coverage station, statistics about the load which is of the coverage station and may be absorbed by each capacity station in the capacity station group $S_{n-1}$ when the capacity station sends the pilot signal at the $P_n$ power level, if the load that may be absorbed by the capacity station exceeds the preset threshold, adding the capacity station to the capacity station group $S_n$; otherwise, excluding the capacity station from the capacity station group $S_n$.

The second preset algorithm may be the following method:

collecting, by the coverage station or the OAM, statistics about the load which is of the coverage station and may be absorbed by each capacity station in $S_{n-1}$ when the capacity station sends the pilot signal at the $P_n$ power level, sequencing the capacity stations in descending order, and selecting first few or multiple capacity stations as the alternative activation capacity station group S, so that after all the capacity stations in the capacity station group absorb the load, the load of the coverage station decreases to a proper level; or selecting, by the coverage station or the OAM, the alternative activation capacity station group with reference to the load that may be absorbed by each capacity station in the capacity station group $S_{n-1}$ when the capacity station sends the pilot signal at the $P_n$ power level, the load that may be absorbed by each capacity station in the capacity station group $S_{n-1}$ when the capacity station sends the pilot signal at a $P_{n+1}$ power level, and a difference between the two; for example, according to whether the load that may be absorbed by each capacity station in the capacity station group $S_{n-1}$ when the capacity station sends the pilot signal at the $P_n$ power level exceeds a certain preset threshold, roughly selecting part of capacity stations as a roughly selected capacity station group, and then, according to a difference between the load that may be absorbed by each capacity station when the capacity station sends the pilot signal at the $P_{n+1}$ power level and a load that may be absorbed by each capacity station when the capacity station sends the pilot signal at a previous power level, carefully selecting the alternative activation capacity station group S from the roughly selected capacity station group, so that after all the capacity stations in the capacity station group absorbs the load, the load of the coverage station decreases to a proper level.

Further, in the whole implementation process of the solution, when the capacity station merely sends the pilot signal and the synchronization signal, the coverage station does not switch the user in the connected state to the capacity station.

A second embodiment of the present invention discloses a cell activation solution in which both a coverage station and a capacity station are EUTRAN base stations. The coverage station provides basic network coverage; the capacity station is deployed in a capacity station area within a coverage range of the coverage station to perform capacity enhancement, and is totally covered by the coverage station. For example, when part or all of capacity stations are in a dormant state and a load of the coverage station is relatively high, capacity station activation may be performed by using the technical solution of the present invention.

In the second embodiment, the capacity station uses two levels of pilot transmit power in an activation decision process, which are $P_{low}$ and $P_{max}$, where the $P_{max}$ is maximum pilot transmit power of the capacity station, and the $P_{low}$ is a preset certain power level lower than the $P_{max}$. It should be noted that, in an actual application of this solution, the capacity station may use more levels of pilot transmit power; in the second embodiment, using two levels of pilot transmit power is only taken as an example for describing the application of this solution.

When the number of users in a connected state in the coverage station exceeds a first threshold, namely, a preset threshold $C_{threshold}$, a capacity station group including all capacity stations in the dormant state within the coverage range of the coverage station is $S_{total}$, where there are N (N≥1) capacity stations in the dormant state participating in activation decision, which are $H_1, H_2, \ldots, H_N$, and a first capacity station group $S_0$ is used to represent these capacity stations that are about to participate in the activation decision. It should be noted that, $S_0$ may be equal to $S_{total}$, and may also be a subset of $S_{total}$, that is, the coverage station may enable all the capacity stations in the dormant state within the coverage range of the coverage station to participate in the activation decision, and may also preselect, according to some algorithms, merely part of the capacity stations in the dormant state within the coverage range of the coverage station to participate in the activation decision. For example, before executing a capacity station activation decision process, the coverage station consults long-term load statistics information of each capacity station in the dormant state, and if the long-term load statistics information shows that in subsequent time, a certain capacity station maintains a quite low load level for a long time after being activated or can merely maintain a medium-high load for a very short time, the coverage station excludes this capacity station from the capacity station group $S_0$. A capacity station which is within the coverage range of the coverage station, and is in the dormant state, but does not belong to the capacity station group $S_0$ maintains the dormant state and does not participate in the activation decision.

The second embodiment mainly includes:

Step 1: When the number of users in the connected state in the coverage station exceeds the first threshold, namely, the preset threshold $C_{threshold}$, the coverage station notifies a capacity station in the capacity station group $S_0$ to send a pilot signal and a synchronization signal at the $P_{max}$ pilot power level for T duration (the capacity station stops sending after sending for T duration and returns to the dormant state), and configures that a user in a connected state in the coverage station measures the pilot signal sent by the capacity stations in $S_0$ for reporting; and according to a measurement result reported by the user, the coverage station executes the following operations: for each capacity station $H_i$, (i=1, 2, \ldots, N), when the capacity station is a target base station, collecting statistics about the number of users in the coverage station that meet a switch condition and report a switch event, and marking the number as $C_{i,1}$; the coverage station selects a capacity station $H_{i\_m}$ (m=1, 2, \ldots, M) with $C_{i,1}$ greater than a second threshold, namely, a preset threshold $C_{threshold\_2}$, and uses $S_1$ ($S_1$ is a subset of $S_0$) to represent a capacity station group including these capacity stations; then, proceed to step 2.

Step 2: The coverage station notifies a capacity station in the capacity station group $S_1$ to send a pilot signal and a synchronization signal at the $P_{low}$ pilot power level for T duration (the capacity station stops sending after sending for T duration and returns to the dormant state), and configures that the user in the connected state in the coverage station measures the pilot signal sent by the capacity station in $S_1$ for reporting; according to a measurement result reported by the user, the coverage station executes the following operations: for each capacity station $H_{i\_m}$, (m=1, 2, \ldots, M), when the capacity station is a target base station, collecting statistics about the number of users in the coverage station that meet a switch condition and report a switch event, and marking the number as $C_{i\_m,2}$; then, proceed to step 3.

Step 3: The coverage station sequences the capacity stations in the capacity station group $S_1$ in descending order of $C_{i\_m,2}$; for the sequenced capacity stations, if first P ($1 \leq P \leq M$) capacity stations exist so that a difference between the total number of current users in the connected state in the coverage station and a sum of $C_{i\_m',2}$ (m'=1, 2, . . . , P) corresponding to the P capacity stations is just less than a third threshold, namely, a preset threshold $C_{threshold\_1}$ (that is, a difference between the total number of the current users in the connected state in the coverage station and a sum of $C_{i\_m',2}$ corresponding to previous P−1 capacity stations is greater than the preset threshold $C_{threshold\_1}$), uses the P capacity stations as alternative capacity stations to be activated and uses a capacity station group $S_{wake\_up}$ ($S_{wake\_up}$ is a subset of the capacity station group $S_1$) to represent a group including the P capacity stations; then, proceed to step 4; if the P capacity stations cannot be selected, that is, the difference between the total number of the current users in the connected state in the coverage station and a sum of $C_{i\_m,2}$ corresponding to all the capacity stations in the capacity station group $S_1$ is still greater than the preset threshold $C_{threshold\_1}$, proceed to step 5.

Step 4: The coverage station activates a capacity station in the capacity station group $S_{wake\_up}$ and lets it work at the $P_{low}$ pilot transmit power level, and another capacity station in the capacity station group $S_0$ continues to maintain the dormant state; then, proceed to step 7.

Step 5: The coverage station sequences the capacity stations in the capacity station group $S_0$ in descending order of $C_{i,1}$; for the sequenced capacity stations, if first Q ($1 \leq Q \leq N$) capacity stations exist so that a difference between the total number of the current users in the connected state in the coverage station and a sum of $C_{i\_m'',1}$ (m''=1, 2, . . . , Q) corresponding to the Q capacity stations is just less than the preset threshold $C_{threshold\_1}$ (that is, a difference between the total number of the current users in the connected state in the coverage station and a sum of $C_{i\_m'',2}$ corresponding to the previous Q−1 capacity stations is greater than the preset threshold $C_{threshold\_1}$), uses the Q capacity stations as alternative capacity stations to be activated and uses the capacity station group $S_{wake\_up}$ ($S_{wake\_up}$ is a subset of the capacity station group $S_0$) to represent a group including the Q capacity stations; then, proceed to step 4; if the Q capacity stations cannot be selected, that is, the difference between the total number of the current users in the connected state in the coverage station and a sum of $C_{i,1}$ corresponding to all the capacity stations in the capacity station group $S_0$ is still greater than the preset threshold $C_{threshold\_1}$, let the capacity station group $S_{wake\_up}$ equal to the capacity station group $S_0$; then, proceed to step 6.

Step 6: The coverage station activates a capacity station in the capacity station group $S_{wake\_up}$ and lets it work at the $P_{max}$ pilot transmit power level, and another capacity station in the capacity station group $S_0$ continues to maintain the dormant state; then, proceed to step 7.

Step 7: When the number of users in the connected state in the coverage station is further increased and exceeds the preset threshold $C_{threshold}$, if a capacity station that is activated but does not work at full transmit power exists within the coverage range of the coverage station, the coverage station notifies the capacity station that is activated but does not work at the full transmit power to increase the pilot power to a maximum transmit level; after all activated capacity stations within the coverage range of the coverage station work at the maximum pilot transmit power level, if the number of users in the connected state in the coverage station is still higher than $C_{threshold}$, the coverage station repeats step 1 to step 6, and executes the capacity station activation process until all the capacity stations within the coverage range of the coverage station are in an activated state and work at the maximum pilot transmit power level.

Further, in the whole implementation process of the solution, when the capacity station merely sends the pilot signal and the synchronization signal, the coverage station does not switch the user in the connected state to the capacity station.

A method provided by a third embodiment of the present invention includes:

Step 1: When an OAM has detected that the number of users in a connected state in a coverage station exceeds a first threshold, namely, a preset threshold $C_{threshold}$, the OAM notifies a capacity station in a capacity station group $S_0$ to send a pilot signal and a synchronization signal at a $P_{max}$ pilot power level for T duration (the capacity station stops sending after sending for T duration and returns to a dormant state), and notifies the coverage station; the coverage station configures that a user in a connected state measures the pilot signal sent by the capacity station in $S_0$ for reporting; according to a measurement result reported by the user in the coverage station, the OAM executes the following operations: for each capacity station $H_i$, (i=1, 2, . . . , N), when the capacity station is a target base station, collecting statistics about the number of users in the coverage station that meet a switch condition and report a switch event, and marking the number as $C_o$; the OAM selects a capacity station $H_{i\_m}$ (m=1, 2, . . . , M) with $C_{i,1}$ greater than a second threshold, namely, a preset threshold $C_{threshold\_2}$, and uses $S_1$ ($S_1$ is a subset of $S_0$) to represent a capacity station group including these capacity stations; then, proceed to step 2.

Step 2: The OAM notifies a capacity station in the capacity station group $S_1$ to send a pilot signal and a synchronization signal at a $P_{low}$ pilot power level for T duration (the capacity station stops sending after sending for T duration and returns to the dormant state) and notifies the coverage station; the coverage station configures that the user in the connected state measures the pilot signal sent by the capacity station in $S_1$ for reporting; according to a measurement result reported by the user in the coverage station, the OAM executes the following operations: for each capacity station $H_{i\_m}$ (m=1, 2, . . . , M), when the capacity station is a target base station, collecting statistics about the number of users in the coverage station that meet a switch condition and report a switch event, and marking the number as $C_{i\_m,2}$; then, proceed to step 3.

Step 3: The OAM sequences the capacity stations in the capacity station group $S_1$ in descending order of $C_{i\_m,2}$; for the sequenced capacity stations, if first P ($1 \leq P \leq M$) capacity stations exist so that a difference between the total number of current users in the connected state in the coverage station and a sum of $C_{i\_m',2}$ (m'=1, 2, . . . , P) corresponding to the P capacity stations is just less than a third threshold, namely, a preset threshold $C_{threshold\_1}$ (that is, a difference between the total number of the current users in the connected state in the coverage station and a sum of $C_{i\_m',2}$ corresponding to previous P−1 capacity stations is greater than the preset threshold $C_{threshold\_1}$), uses the P capacity stations as alternative capacity stations that need to be activated to meet a system requirement and uses a capacity station group $S_{wake\_up}$ ($S_{wake\_up}$ is a subset of the capacity station group $S_1$) to represent a group including the P capacity stations; then, proceed to step 4; if the P capacity stations cannot be selected, that is, the difference between the total number of the current users in the connected state in the coverage station and a sum of $C_{i\_m,2}$ corresponding to all the capacity stations in the capacity station group $S_1$ is still greater than the preset threshold $C_{threshold\_1}$, proceed to step 5.

Step 4: The OAM activates a capacity station in the capacity station group $S_{wake\_up}$, lets it work at the $P_{low}$ pilot transmit power level, and notifies the coverage station of a state switch of the capacity station and pilot power information, where another capacity station in the capacity station group $S_0$ continues to maintain the dormant state; then, proceed to step 7.

Step 5: The OAM sequences the capacity stations in the capacity station group $S_0$ in descending order of $C_{i,1}$; for the sequenced capacity stations, if first Q ($1 \leq Q \leq N$) capacity stations exist so that a difference between the total number of current users in the connected state in the coverage station and a sum of $C_{i\_m'',1}$ (m''=1, 2, ..., Q) corresponding to the Q capacity stations is just less than the preset threshold $C_{threshold\_1}$ (that is, a difference between the total number of the current users in the connected state in the coverage station and a sum of $C_{i\_m'',2}$ corresponding to the previous Q-1 capacity stations is greater than the preset threshold $C_{threshold\_1}$), uses the Q capacity stations as alternative capacity stations to be activated and uses the capacity station group $S_{wake\_up}$ ($S_{wake\_up}$ is a subset of the capacity station group $S_0$) to represent a group including the Q capacity stations; then, proceed to step 4; if the Q capacity stations cannot be selected, that is, the difference between the total number of the current users in the connected state in the coverage station and a sum of $C_{i,1}$ corresponding to all the capacity stations in the capacity station group $S_0$ is still greater than the preset threshold $C_{threshold\_1}$, let the capacity station group $S_{wake\-up}$ equal to the capacity station group $S_0$; then, proceed to step 6.

Step 6: The OAM activates a capacity station in the capacity station group $S_{wake\_up}$ and lets it work at the $P_{max}$ pilot transmit power level, and another capacity station in the capacity station group $S_0$ continues to maintain the dormant state; then, proceed to step 7.

Step 7: When the number of users in the connected state in the coverage station is further increased and exceeds the preset threshold $C_{threshold}$, if a capacity station that is activated but does not work at full transmit power exists within the coverage range of the coverage station, the OAM notifies the capacity station that is activated but does not work at the full transmit power to increase the pilot power to a maximum transmit level; after all activated capacity stations within the coverage range of the coverage station work at the maximum pilot transmit power level, if the number of users in the connected state in the coverage station is still higher than $C_{threshold}$, the OAM repeats step 1 to step 6, and executes the capacity station activation process until all the capacity stations within the coverage range of the coverage station are in an activated state and work at the maximum pilot transmit power level.

It should be noted that, if the capacity station uses more than two levels of pilot transmit power in the activation decision process, repeat step 1 to step 6.

In a fourth embodiment of the present invention, a coverage station locating at a frequency point f1 provides basic network coverage for a certain area, a capacity station locating at a frequency point f2 overlaps the coverage station in coverage, where a coverage station A and a capacity station B may be base stations of different standards, and may also be inter-frequency base stations of a same standard. All or part of base stations in the capacity station are in a dormant state for saving energy, for example, when a load of the coverage station A is relatively high, the technical solution provided by this embodiment may be used to activate all or part of the base stations in the dormant state in the capacity station, and enable the base stations to work at a proper pilot transmit power level, and ensure that the load of the coverage station A decreases to a proper level.

This embodiment mainly includes:

Step 1: When an OAM has detected that the number of users in a connected state in a coverage station exceeds a first threshold, namely, a preset threshold $C_{threshold}$, the OAM notifies a capacity station in a capacity station group $S_0$ to send a pilot signal and a synchronization signal at a $P_{max}$ pilot power level for T duration (the capacity station stops sending after sending for T duration and returns to a dormant state) and notifies the coverage station; the coverage station configures that a user in a connected state measures the pilot signal sent by the capacity station in $S_0$ for reporting; according to a measurement result reported by the user in the coverage station, the OAM executes the following operations: for each capacity station $H_i$, (i=1, 2, ..., N), when the capacity station is a target base station, collecting statistics about the number of users in the coverage station that meet a switch condition and report a switch event, and marking the number as $C_{i,1}$; the OAM selects a capacity station $H_{i\_m}$ (m=1, 2, ..., M) with $C_{i,1}$ greater than a second threshold, namely, a preset threshold $C_{threshold\_2}$, and uses $S_1$ ($S_1$ is a subset of $S_0$) to represent a capacity station group including these capacity stations; then, proceed to step 2.

Step 2: The OAM notifies a capacity station in the capacity station group $S_1$ to send a pilot signal and a synchronization signal at a $P_{low}$ pilot power level for T duration (the capacity station stops sending after sending for T duration and returns to the dormant state) and notifies the coverage station; the coverage station configures that the user in the connected state measures the pilot signal sent by the capacity stations in $S_1$ for reporting; according to a measurement result reported by the user in the coverage station, the OAM executes the following operations: for each capacity station $H_{i\_m}$, (m=1, 2, ..., M), when the capacity station is a target base station, collecting statistics about the number of users in the coverage station that meet a switch condition and report a switch event, and marking the number as $C_{i\_m,2}$; then, proceed to step 3.

Step 3: The OAM sequences the capacity stations in the capacity station group $S_1$ in descending order of $C_{i\_m,2}$; for the sequenced capacity stations, if first P ($1 \leq P \leq M$) capacity stations exist so that a difference between the total number of current users in the connected state in the coverage station and a sum of $C_{i\_m',2}$ (m'=1, 2, ..., P) corresponding to the P capacity stations is just less than a third threshold, namely, a preset threshold $C_{threshold\_1}$ (that is, a difference between the total number of the current users in the connected state in the coverage station and a sum of $C_{i\_m',2}$ corresponding to previous P-1 capacity stations is greater than the preset threshold $C_{threshold\_1}$), uses the P capacity stations as alternative capacity stations to be activated and uses a capacity station group $S_{wake\_up}$ ($S_{wake\_up}$ is a subset of the capacity station group $S_1$) to represent a group including the P capacity stations; then, proceed to step 4; if the P capacity stations cannot be selected, that is, the difference between the total number of the current users in the connected state in the coverage station and a sum of $C_{i\_m,2}$ corresponding to all the capacity stations in the capacity station group $S_1$ is still greater than the preset threshold $C_{threshold\_1}$, proceed to step 5.

Step 4: The OAM activates a capacity station in the capacity station group $S_{wake\_up}$, lets it work at the $P_{low}$ pilot transmit power level, and notifies the coverage station of a state switch of the capacity station and pilot power information, where another capacity station in the capacity station group $S_0$ continues to maintain the dormant state; then, proceed to step 7.

Step 5: The OAM sequences the capacity stations in the capacity station group $S_0$ in descending order of $C_{i,1}$; for the sequenced capacity stations, if first Q (1≤Q≤N) capacity stations exist so that a difference between the total number of current users in the connected state in the coverage station and a sum of $C_{i\_m'',1}$ (m''=1, 2, ..., Q) corresponding to the Q capacity stations is just less than the preset threshold $C_{threshold\_1}$ (that is, a difference between the total number of the current users in the connected state in the coverage station and a sum of $C_{i\_m'',2}$ corresponding to the previous Q−1 capacity stations is greater than the preset threshold $C_{threshold\_1}$), uses the Q capacity stations as alternative capacity stations to be activated and uses the capacity station group $S_{wake\_up}$ ($S_{wake\_up}$ is a subset of the capacity station group $S_0$) to represent a group including the Q capacity stations; then, proceed to step 4; if the Q capacity stations cannot be selected, that is, the difference between the total number of the current users in the connected state in the coverage station and a sum of $C_{i,1}$ corresponding to all the capacity stations in the capacity station group $S_0$ is still greater than the preset threshold $C_{threshold\_1}$, let the capacity station group $S_{wake\_up}$ equal to the capacity station group $S_0$; then, proceed to step 6.

Step 6: The OAM activates a capacity station in the capacity station group $S_{wake\_up}$ and lets it work at the $P_{max}$ pilot transmit power level, and another capacity station in the capacity station group $S_0$ continues to maintain the dormant state; then, proceed to step 7.

Step 7: When the number of users in the connected state in the coverage station is further increased and exceeds the preset threshold $C_{threshold}$, if a capacity station that is activated but does not work at full transmit power exists within the coverage range of the coverage station, the OAM notifies the capacity station that is activated but does not work at the full transmit power to increase the pilot power to a maximum transmit level; after all activated capacity stations within the coverage range of the coverage station work at the maximum pilot transmit power level, if the number of users in the connected state in the coverage station is still higher than $C_{threshold}$, the OAM repeats step 1 to step 6, and executes the capacity station activation process until all the capacity stations within the coverage range of the coverage station are in an activated state and work at the maximum pilot transmit power level.

It should be noted that, if the capacity station uses more than two levels of pilot transmit power in the activation decision process, repeat step 1 to step 6.

In the foregoing embodiments, the capacity station sends the pilot signal according to an instruction of the coverage station or the OAM in a power decreasing manner; the coverage station configures that the user measures the pilot signal sent by the capacity station at different power levels for reporting, analyzes and processes the measurement result reported by the user each time. In this way, on one hand, the load which is of the coverage station and may be absorbed by each capacity station after each capacity station is activated may be determined; on the other hand, a probable user distribution situation after the capacity station is activated may be obtained. With reference to the information of the two aspects, the coverage station or the OAM may improve decision accuracy of activation of the capacity station to a great extent and avoid activating a wrong capacity station when activating a correct capacity station, thereby avoiding a waste of power and resources caused due to error activation of the capacity station, avoiding unnecessary mobility of the user between the capacity station and the coverage station, and improving an overall energy saving effect of the network.

Meanwhile, embodiments of the present invention further provide an apparatus and a system for implementing the foregoing method, which are used to implement the foregoing method. In the apparatus and system embodiments, the method that may be implemented by the apparatus and the system has been described above.

Figure 2:
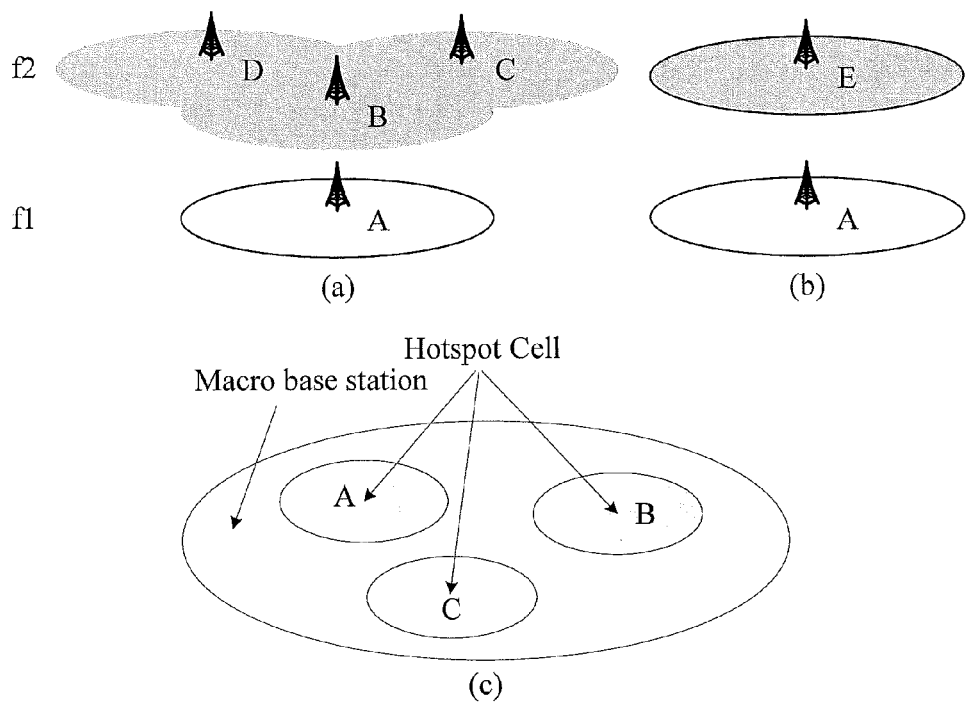
FIG. 2 is a schematic diagram of a wireless communication system according to an embodiment of the present invention.

As shown in FIG. 2, a wireless communication system includes a capacity station and a coverage station, where the capacity station belongs to the coverage station, and the capacity station includes at least two transmit power levels.

As shown in FIG. 2, a wireless communication system includes a capacity station and a coverage station, where the capacity station belongs to the coverage station, and the capacity station includes at least two transmit power levels. In FIG. 2, (a) indicates that a base station of a different standard or an inter-frequency base station of a same standard B/C/D overlaps a base station A in coverage; (b) indicates that a base station of a different standard or an inter-frequency base station of a same standard E and the base station A are co-site, where the base station A locating at a frequency point f1 is a coverage station providing basic network coverage for a certain area, and the base station E locating at the frequency point f1 is a capacity station. For (a) and (b) in FIG. 2, A is a coverage station and B/C/D/E is a capacity station. A macro base station in (C) is a base station providing basic network coverage, that is, a coverage station; a hot spot cell provides a service upgrade or capacity enhancement and overlaps the coverage station, and is a capacity station.

The coverage station is configured to: send multiple pieces of activation control information to the capacity station, where the multiple pieces of activation control information enable the capacity station to send a pilot signal to a user in a power decreasing manner; receive a pilot signal measurement result from the user; determine, according to the measurement result, a capacity station that needs to be activated to meet a system requirement; and send activation information to the determined capacity station that needs to be activated.

The capacity station is configured to: receive the activation control information from the coverage station; and send the pilot signal to the user in a transmit power decreasing manner until the coverage station determines the capacity station that needs to be activated to meet the system requirement; and is further configured to: receive, in a dormant state, the activation information sent by the coverage station, change to a working state, and work at the power at which the capacity station sends the pilot signal when the coverage station sends the activation information to the determined capacity station that needs to be activated.

Further, specifically, the coverage station sends first activation control information to a capacity station in a first capacity station group $S_0$, where the activation control information is used to enable the capacity station to send a first pilot signal to a user at first transmit power and enable the user to measure the pilot signal.

The coverage station receives a pilot signal measurement result sent by the user, and selects a second capacity station group $S_1$ from the capacity station according to the first pilot signal measurement result.

The coverage station sends second activation control information to the second capacity station group $S_1$, where the second activation control information is used to enable a capacity station in the second capacity station group $S_1$ to send a second pilot signal to the user at second transmit power and enable the user to measure the pilot signal, and the second transmit power is less than the first transmit power.

The coverage station receives a second pilot signal measurement result sent by the user, calculates a load of each capacity station in the second capacity station group $S_1$ according to the second pilot signal measurement result; and determines, according to the load of each capacity station in the second capacity station group $S_1$, a capacity station that needs to be activated to meet a system requirement.

The coverage station sends activation information to the capacity station that needs to be activated, activates the capacity station that needs to be activated, and enables it to work at the second transmit power after it is activated.

Figure 3:
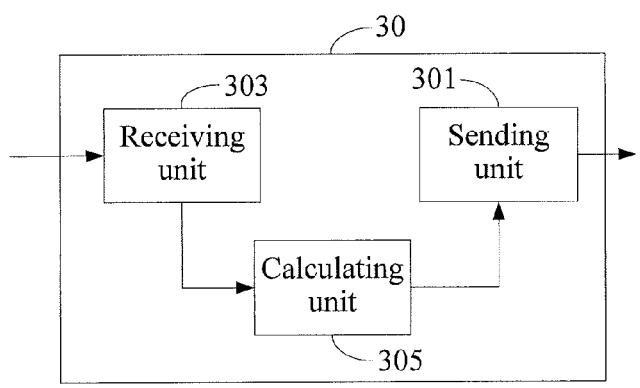
FIG. 3 is a schematic structural diagram of a base station according to an embodiment of the present invention.

Further, an embodiment of the present invention provides a base station. The base station acts as a coverage station and can implement processing performed by the coverage station in the foregoing method embodiment. A specific processing procedure is the description in the foregoing method embodiment. Referring to FIG. 3, FIG. 3 is a schematic structural diagram of a base station 30 according to an embodiment of the present invention. The base station 30 includes:

a sending unit 301, configured to send multiple pieces of activation control information to a capacity station that belongs to the base station, where the multiple pieces of activation control information are used to enable the capacity station to send a pilot signal to a user in a power decreasing manner;

a receiving unit 303, configured to receive a pilot signal measurement result sent by the user; and a calculating unit 305, configured to: determine, according to the pilot signal measurement result sent by the user, a capacity station that needs to be activated to meet a system requirement, where the sending unit sends activation information to the capacity station that needs to be activated, so that the capacity station that needs to be activated and is in a dormant state changes to a working state and works at the power at which the capacity station sends the pilot signal when the coverage station sends the activation information to the determined capacity station that needs to be activated.

Further, the sending unit is specifically configured to send first activation control information to a capacity station in a first capacity station group $S_0$, where the activation control information is used to enable the capacity station to send a first pilot signal to a user at first transmit power and enable the user to measure the pilot signal.

The receiving unit 303 receives a pilot signal measurement result sent by the user; the calculating unit 305 selects a second capacity station group $S_1$ from the capacity station according to the first pilot signal measurement result.

The sending unit further sends second activation control information to the second capacity station group $S_1$, where the second activation control information is used to enable a capacity station in the second capacity station group $S_1$ to send a second pilot signal to the user at second transmit power and enable the user to measure the pilot signal, and the second transmit power is less than the first transmit power.

The receiving unit 303 further receives a second pilot signal measurement result sent by the user; the calculating unit 305 calculates a load of each capacity station in the second capacity station group $S_1$ according to the second pilot signal measurement result; and determines, according to the load of each capacity station in the second capacity station group $S_1$, a capacity station that needs to be activated to meet a system requirement.

The sending unit sends activation information to the capacity station that needs to be activated, activates the capacity station that needs to be activated, and enables it to work at the second transmit power after it is activated.

Further, the sending unit is further configured to send configuration information to the user, where the configuration information is used to enable the user to measure a received pilot signal and return a measurement result.

The selecting, by the calculating unit 305, the second capacity station group $S_1$ from the capacity station according to the first pilot signal measurement result includes: determining a load of each capacity station according to the first pilot signal measurement result, and selecting a capacity station whose load is greater than a second threshold to form the second capacity station group $S_1$.

Further, the determining, by the calculating unit 305 and according to the load of each capacity station in the second capacity station group $S_1$, the capacity station that needs to be activated to meet the system requirement includes: selecting P capacity stations from the second capacity station group $S_1$ so that a difference between a load of a current coverage station and a total load of the P capacity stations is less than a third threshold, or a difference between a total load of a current coverage station and a load of P−1 capacity stations is greater than the third threshold, and determining the P capacity stations as the capacity stations that need to be activated.

If the P capacity stations that need to be activated to meet a system requirement cannot be selected from the second capacity station group $S_1$, the calculating unit 305 further determines a load of the capacity station according to the first pilot signal measurement result, and selects Q capacity stations so that a difference between the load of the current coverage station and a total load of the Q capacity stations is less than the third threshold, or a difference between the load of the current coverage station and a total load of Q−1 capacity stations is greater than the third threshold, and determines the Q capacity stations as the capacity stations that need to be activated.

In the foregoing embodiments, in the wireless communication system, the capacity station sends the pilot signal in a power decreasing manner according to an instruction of the coverage station; the coverage station configures that the user measures the pilot signal sent by the capacity station at different power levels for reporting, analyzes and processes the measurement result reported by the user each time. In this way, on one hand, the load which is of the coverage station and may be absorbed by each capacity station after each capacity station is activated may be determined; on the other hand, a probable user distribution situation after the capacity station is activated may be obtained. With reference to the information of the two aspects, the coverage station may improve decision accuracy of activation of the capacity station to a great extent and avoid activating a wrong capacity station when activating a correct capacity station, thereby avoiding a waste of power and resources caused due to error activation of the capacity station, avoiding unnecessary mobility of the user between the capacity station and the coverage station, and improving an overall energy saving effect of the network.

Persons of ordinary skill in the art should understand that all or part of the steps of the foregoing method embodiments may be implemented by a program instructing relevant hardware.

The program may be stored in a computer readable storage medium. When the program is run, the steps of the foregoing method embodiments are performed. The storage medium may be any medium that is capable of storing program codes, such as a ROM, a RAM, a magnetic disk or an optical disk.

What is claimed is:

1. A capacity station activation method, comprising:
sending first activation control information to a capacity station in a first capacity station group $S_o$, wherein the activation control information is used to enable the capacity station to send a first pilot signal to a user at first transmit power and enable the user to measure the first pilot signal;
receiving a first pilot signal measurement result sent by the user, and selecting a second capacity station group $S_1$ from the capacity station according to the first pilot signal measurement result;
sending second activation control information to the second capacity station group $S_1$, wherein the second activation control information is used to enable a capacity station in the second capacity station group $S_1$ to send a second pilot signal to the user at second transmit power and enable the user to measure the second pilot signal, and the second transmit power is less than the first transmit power;
receiving a second pilot signal measurement result sent by the user, calculating a load of each capacity station in the second capacity station group $S_1$ according to the second pilot signal measurement result; and determining, according to the load of each capacity station in the second capacity station group $S_1$, a capacity station that needs to be activated to meet a system requirement; and
sending activation information to the capacity station that needs to be activated, activating the capacity station that needs to be activated and enabling it to work at the second transmit power after it is activated.

2. The method according to claim 1, further comprising:
determining a load of a coverage station to which the capacity station in the first capacity station group belongs; and if the load of the coverage station is greater than a first threshold, triggering sending of the first activation control information to the capacity station in the first capacity station group by the coverage station, wherein the capacity station in the first capacity station group is the capacity station that belongs to the coverage station and is in a dormant state.

3. The method according to claim 1, further comprising:
determining, according to historical load information of the capacity station, a capacity station group participating in activation decision, wherein the capacity station group participating in the activation decision is the first capacity station group $S_0$.

4. The method according to claim 1, wherein if the capacity station that needs to be activated to meet the system requirement cannot be determined according to the load of each capacity station in the second capacity station group $S_1$, an activation signal is sent to the first capacity station group $S_0$ to activate the capacity station in the first capacity station group and enable the capacity station to work at the first transmit power or maximum transmit power.

5. The method according to claim 2, wherein if the load of the coverage station to which the capacity station in the first capacity station group $S_0$ belongs rises, activation control information is sent to the capacity station in the first capacity station group $S_0$ to enable the capacity station in the first capacity station group $S_0$ to send a pilot signal to the user at different levels of transmit power in a power decreasing manner; and iterative processing is performed until the capacity station that needs to be activated to meet the system requirement is determined.

6. The method according to claim 2, wherein if the load of the coverage station to which the capacity station in the first capacity station group belongs rises, control information is sent to an activated capacity station to enable the activated capacity station to work at maximum power.

7. The method according to claim 2, wherein configuration information is sent to a user that belongs to the coverage station or a user that belongs to the coverage station through the capacity station, and the configuration information is used to enable the user to measure a received pilot signal and send a measurement result to the coverage station.

8. The method according to claim 1, wherein the receiving the first pilot signal measurement result sent by the user and selecting the second capacity station group $S_1$ from the capacity station according to the first pilot signal measurement result comprises: determining the load of each capacity station according to the first pilot signal measurement result, and selecting a capacity station whose load is greater than a second threshold to form the second capacity station group $S_1$.

9. The method according to claim 2, wherein the determining, according to the load of each capacity station in the second capacity station group $S_1$, the capacity station that needs to be activated to meet the system requirement comprises: selecting P capacity stations from the second capacity station group $S_1$ so that a difference between a load of a current coverage station and a total load of the P capacity stations is less than a third threshold, and determining the P capacity stations as the capacity stations that need to be activated.

10. The method according to claim 9, wherein the determining, according to the load of each capacity station in the second capacity station group $S_1$, the capacity station that needs to be activated to meet the system requirement further comprises: if a difference between a total load of the coverage station and a load of P–1 capacity stations in the P capacity stations is greater than the third threshold, determining the P capacity stations as the capacity stations that need to be activated.

11. The method according to claim 9, wherein if the P capacity stations that need to be activated to meet the system requirement cannot be selected from the second capacity station group $S_1$, the load of the capacity station is determined according to the first pilot signal measurement result, Q capacity stations are selected so that a difference between the load of the current coverage station and a total load of the Q capacity stations is less than the third threshold, and the Q capacity stations are determined as the capacity stations that need to be activated.

12. The method according to claim 11, wherein if the P capacity stations that need to be activated to meet the system requirement cannot be selected from the second capacity station group $S_1$, the method further comprises: if a difference between the load of the current coverage station and a total load of Q–1 capacity stations in the Q capacity stations is greater than the third threshold, determining the Q capacity stations as the capacity stations that need to be activated.

13. A wireless communication system, comprising:
a capacity station; and
a coverage station, wherein the capacity station belongs to the coverage station, and the capacity station comprises at least two transmit power levels;
the coverage station is configured to: send multiple pieces of activation control information to the capacity station, wherein the multiple pieces of activation control information enable the capacity station to send a pilot signal to a user in a power decreasing manner;
receive a pilot signal measurement result from the user; determine, according to the measurement result, a capacity station that needs to be activated to meet a system requirement;
and send activation information to the determined capacity station that needs to be activated; and
the capacity station is configured to: receive the activation control information from the coverage station; and send the pilot signal to the user in a transmit power decreasing manner until the coverage station determines the capacity station that needs to be activated to meet the system requirement; and is further configured to: receive, in a dormant state, the activation information sent by the coverage station, change to a working state, and work at the power at which the capacity station sends the pilot signal when the coverage station sends the activation information to the determined capacity station that needs to be activated.

14. The system according to claim 13, wherein when the coverage station is configured to send the activation control information to the capacity station, receive the pilot signal measurement result from the user, and determine, according to the measurement result, the capacity station that needs to be activated to meet the system requirement,
the coverage station sends first activation control information to a capacity station in a first capacity station group $S_0$, wherein the first activation control information is used to enable the capacity station to send a first pilot signal to a user at first transmit power and enable the user to measure the first pilot signal;
the coverage station receives the first pilot signal measurement result sent by the user, and selects a second capacity station group $S_1$ from the capacity station according to the first pilot signal measurement result;
the coverage station sends second activation control information to the second capacity station group $S_1$, wherein the second activation control information is used to enable a capacity station in the second capacity station group $S_1$ to send a second pilot signal to the user at second transmit power and enable the user to measure the second pilot signal, and the second transmit power is less than the first transmit power;
the coverage station receives a second pilot signal measurement result sent by the user, calculates a load of each capacity station in the second capacity station group $S_1$ according to the second pilot signal measurement result; and determines, according to the load of each capacity station in the second capacity station group $S_1$, a capacity station that needs to be activated to meet a system requirement; and
the coverage station sends activation information to the capacity station that needs to be activated, activates the capacity station that needs to be activated, and enables it to work at the second transmit power after it is activated.

15. A communication base station, comprising:
a sending unit, configured to send multiple pieces of activation control information to a capacity station that belongs to the base station, wherein the multiple pieces of activation control information are used to enable the capacity station to send a pilot signal to a user in a power decreasing manner;
a receiving unit, configured to receive a pilot signal measurement result sent by the user; and
a calculating unit, configured to: determine, according to the pilot signal measurement result sent by the user, a capacity station that needs to be activated to meet a system requirement, wherein the sending unit sends activation information to the capacity station that needs to be activated, so that the capacity station that needs to be activated and is in a dormant state changes to a working state and works at the power at which the capacity station sends the pilot signal when the coverage station sends the activation information to the determined capacity station that needs to be activated.

16. The base station according to claim 15, wherein the sending unit is specifically configured to send first activation control information to a capacity station in a first capacity station group $S_0$, and the activation control information is used to enable the capacity station to send a first pilot signal to a user at first transmit power and enable the user to measure the first pilot signal;
the receiving unit receives a first pilot signal measurement result sent by the user; the calculating unit selects a second capacity station group $S_1$ from the capacity station according to the first pilot signal measurement result;
the sending unit further sends second activation control information to the second capacity station group $S_1$, wherein the second activation control information is used to enable a capacity station in the second capacity station group $S_1$ to send a second pilot signal to the user at second transmit power and enable the user to measure the second pilot signal, and the second transmit power is less than the first transmit power;
the receiving unit further receives a second pilot signal measurement result sent by the user; the calculating unit calculates a load of each capacity station in the second capacity station group $S_1$ according to the second pilot signal measurement result; and determines, according to the load of each capacity station in the second capacity station group $S_1$, a capacity station that needs to be activated to meet a system requirement; and
the sending unit sends activation information to the capacity station that needs to be activated, activates the capacity station that needs to be activated, and enables it to work at the second transmit power after it is activated.

17. The base station according to claim 16, wherein the sending unit is further configured to send configuration information to the user, and the configuration information is used to enable the user to measure a received pilot signal and return a measurement result.

18. The base station according to claim 16, wherein the selecting, by the calculating unit, the second capacity station group $S_1$ from the capacity station according to the first pilot signal measurement result comprises: determining the load of each capacity station according to the first pilot signal measurement result, and selecting a capacity station whose load is greater than a second threshold to form the second capacity station group $S_1$.

19. The base station according to claim 18, wherein the determining, by the calculating unit and according to the load of each capacity station in the second capacity station group $S_1$, the capacity station that needs to be activated to meet the system requirement comprises: selecting P capacity stations from the second capacity station group $S_1$ so that a difference between a load of a current coverage station and a total load of the P capacity stations is less than a third threshold, and determining the P capacity stations as the capacity stations that need to be activated.

20. The base station according to claim 19, wherein the determining, by the calculating unit and according to the load of each capacity station in the second capacity station group $S_1$, the capacity station that needs to be activated to meet the system requirement comprises: if a difference between the total load of the current coverage station and a load of P−1 capacity stations is greater than the third threshold, determining the P capacity stations as the capacity stations that need to be activated.

21. The base station according to claim 18, wherein if the P capacity stations that need to be activated to meet the system requirement cannot be selected from the second capacity station group $S_1$, the calculating unit is further configured to: determine the load of the capacity station according to the first pilot signal measurement result, select Q capacity stations so that a difference between the load of the current coverage station and a total load of the Q capacity stations is less than the third threshold, and determine the Q capacity stations as the capacity stations that need to be activated.

22. The base station according to claim 21, wherein if the P capacity stations that need to be activated to meet the system requirement cannot be selected from the second capacity station group $S_1$, the calculating unit is further configured to: if a difference between the load of the current coverage station and a total load of Q−1 capacity stations is greater than the third threshold, determine the Q capacity stations as the capacity stations that need to be activated.

23. A wireless communication system, comprising:
 a capacity station; and
 a coverage station, wherein the capacity station is in communication with the coverage station, and the capacity station comprises at least two transmit power levels;
 the coverage station is configured to: send activation control information to the capacity station, wherein the activation control information enables the capacity station to send a pilot signal to a user in a power decreasing manner; receive a pilot signal measurement result from the user; determine, according to the measurement result, a capacity station that needs to be activated to meet a system requirement; and send activation information to the determined capacity station that needs to be activated; and
 the capacity station is configured to: receive the activation control information from the coverage station; and send the pilot signal to the user in a transmit power decreasing manner until the coverage station determines the capacity station that needs to be activated to meet the system requirement; and is further configured to: receive, in a dormant state, the activation information sent by the coverage station, change to a working state, and work at the power at which the capacity station sends the pilot signal when the coverage station sends the activation information to the determined capacity station that needs to be activated.

* * * * *